Nov. 21, 1939.  G. D. BOWER  2,180,503
ADJUSTABLE FOLLOW-UP CONTROL SYSTEM
Filed May 6, 1937  2 Sheets-Sheet 1

Inventor
George D. Bower
By George H Fisher
Atty.

Nov. 21, 1939.  G. D. BOWER  2,180,503

ADJUSTABLE FOLLOW-UP CONTROL SYSTEM

Filed May 6, 1937  2 Sheets-Sheet 2

Inventor
George D. Bower
By George H. Fisher
Atty.

Patented Nov. 21, 1939

2,180,503

UNITED STATES PATENT OFFICE 2,180,503

ADJUSTABLE FOLLOW-UP CONTROL SYSTEM

George D. Bower, Columbia Heights, Minn., assignor to Minneapolis-Honeywell Regulator Company, Minneapolis, Minn., a corporation of Delaware Application May 6, 1937, Serial No. 141,112

9 Claims. (Cl. 172—239)

This invention relates to follow-up control systems in general but more particularly to that type of follow-up control system disclosed in application Serial No. 673,236 filed by Lewis L. Cunningham on May 27, 1933, which has matured into Patent No. 2,160,400, issued May 30, 1939.

The follow-up control system of the aforesaid Cunningham application, which is utilized for purposes of illustration in this application, may comprise a reversible motor for performing a function, a relay for controlling the operation of the motor, and a control potentiometer and a balancing potentiometer for controlling the relay, the arrangement being such that the motor is positioned in accordance with the adjustment of the control potentiometer.

An object of this invention is to provide an adjusting mechanism for such a follow-up control system whereby the positioning of the motor by the control potentiometer may be varied at will.

A further object of this invention is to provide an adjusting mechanism for increasing or decreasing the range of movement of the motor for a given range of movement of the control potentiometer.

Still another object of this invention is to provide an adjusting mechanism for a follow-up control system wherein the range of movement of the motor may be shifted bodily with respect to the range of movement of the control potentiometer.

Other objects and advantages will become apparent to those skilled in the art upon reference to the accompanying specification, claims and drawings.

Figure 1:
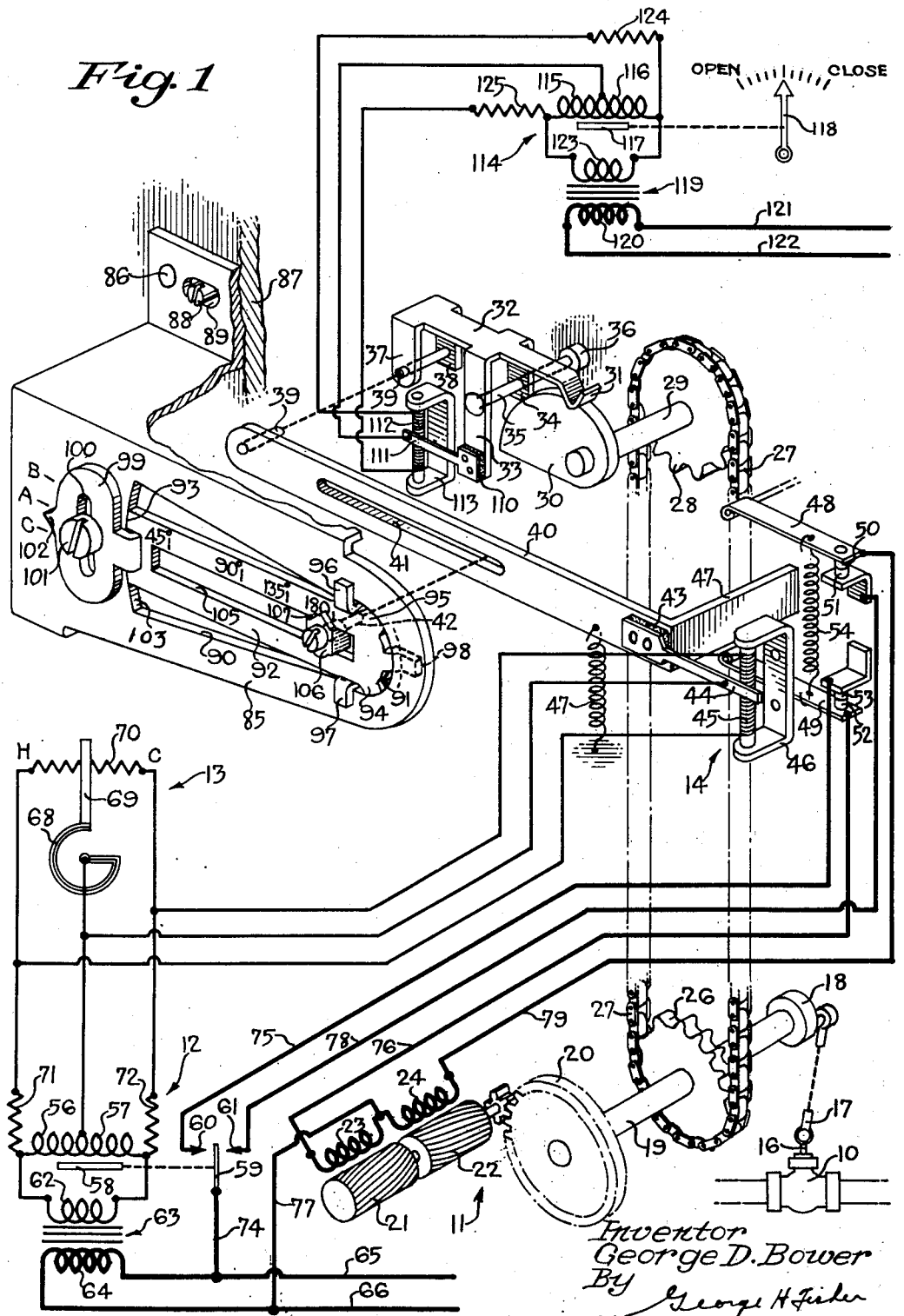

For a more thorough understanding of this invention reference is made to the accompanying sheets of drawings in which, Figure 1 is a diagrammatic illustration of a follow-up control system along with an exploded view of the adjusting mechanism, Figures 2, 3, 4 and 5 show diagrammatically various adjustments of the adjusting mechanism to more clearly illustrate the mode of operation.

For purposes of illustration it is assumed that the follow-up control system of this invention is utilized for controlling the temperature of a space. In Figure 1 therefore, 10 designates a valve for controlling the supply of heating fluid to a space. The valve 10 is positioned by an electric motor 11 which in turn is controlled by a relay 12. The relay 12 is controlled by a control potentiometer 13 and a balancing potentiometer 14. Since the control system is described in connection with a heating system for a space the control potentiometer 13 is shown to be thermostatically operated in accordance with variations in space temperature.

The valve 10 is operated by a valve stem 16 which is connected by a pitman 17 to a crank 18 carried by a crank disc 18. The crank disc 18 is mounted on the shaft 19 of the electric motor 11. The shaft 19 is driven through a reduction gear train 20 by motor rotors 21 and 22. The rotors 21 and 22 are controlled by field windings 23 and 24 respectively, the arrangement being such that when the field winding 23 is energized the shaft 19 is rotated in a counter-clockwise direction to cause opening movement of the valve 10 and when the field winding 24 is energized the shaft 19 is rotated in a clockwise direction to cause closing movement of the valve 10.

The shaft 19 carries a sprocket wheel 26 which is connected by a chain 27 to a sprocket wheel 28 mounted on a shaft 29. Preferably the sprocket wheels 26 and 28 are of the same diameter so that the shafts 19 and 29 are simultaneously rotated equal amounts in the same direction. The shaft 29 carries a straight line cam 30 which is engaged by a follower 31 carried by one end of a lever 32. The lever 32 is provided with depending lugs 33 and 34 for pivotally mounting the lever 32 on a stationary pivot pin 35. The pivot pin 35 is maintained stationary in any suitable manner as by a support 36. The other end of the lever 32 is provided with depending lugs 37 and 38 carrying a pin 39. The pin 39 is also secured to a lever 40 which is provided with a longitudinal slot 41. A pivot pin 42 is engageable in the slot 41 and acts as a fulcrum for the lever 40. For any given adjustment the pivot pin 42 remains stationary and therefore forms a stationary fulcrum for the lever 40. The other end of the lever 40 carries by means of an insulating pad 43 a slider 44 which is adapted to slidably contact a resistance element 45 carried by a stationary bracket 46. The slider 44 and the resistance element 45 form the balancing potentiometer 14. A tension spring 47 secured to the lever 40 holds the cam follower 31 in engagement with the cam 30.

Counter-clockwise rotation of the shafts 19 and 29 and the cam 30 as an incident to opening movement of the valve 10 causes clockwise movement of the lever 32 about its stationary pivot pin 35. The pin 39 carried by the lever 32 causes clockwise rotation of the lever 40 about its stationary pivot 42 to move the slider 44 downwardly with respect to the resistance element 45. Conversely clockwise rotation of the cam 30 as an incident to closing movement of the valve 10 causes counter-clockwise movement of the lever 40 about its pivot pin 42 with consequent upward movement of the slider 44 with respect to the resistance element 45.

The lever 40 carries a lug 47 which is adapted to engage pivoted arms 48 and 49 when the slider 44 is moved to the extreme upper position or to the extreme lower position respectively. The pivoted arm 48 carries a contact 50 which is adapted to engage a contact 51 and likewise the arm 49 carries a contact 52 which is adapted to engage a stationary contact 53. A spring 54 normally holds these contacts in engagement but upon extreme movement of the lever 40 these contacts are opened. These contacts are included in the circuits to the field windings of the motor 11 and therefore act as limit switches.

The relay generally designated at 12 may comprise series connected relay coils 56 and 57 for influencing an armature 58. The armature 58 operates a switch arm 59 with respect to contacts 60 and 61. The arrangement is such that when the relay coil 56 is energized more than the relay coil 57 the switch arm 59 is moved into engagement with the contact 60 and when the relay coil 57 is energized more than the relay coil 56 the switch arm 59 is moved into engagement with the contact 61. When the relay coils 56 and 57 are equally energized the switch arm 59 is maintained spaced midway between the contacts 60 and 61 as shown in Figure 1. The outer ends of the relay coils 56 and 57 are connected across a secondary 62 of a step-down transformer 63 having a primary 64 connected across line wires 65 and 66. The inner ends of the relay coils 56 and 57 are connected together. By reason of these connections it is seen that the relay coils 56 and 57 are connected in series and across a source of power.

The control potentiometer 13 may comprise a thermostatic element 68 responsive to variations in space temperature for operating a slider 69 with respect to a resistance element 70. The slider 69 and the resistance element 70 form the control potentiometer. Upon an increase in space temperature the slider 69 is moved to the left in the direction indicated by the character H and upon a decrease in space temperature the slider 59 is moved to the right in the direction indicated by the character C. The left end of the resistance element 70 of the control potentiometer and the lower end of the resistance element 45 of the balancing potentiometer are connected through a protective resistance 71 to the left end of the relay coil 56. In a like manner the right end of the resistance element 70 and the upper end of the resistance element 45 are connected through a protective resistance 72 to the right end of the relay coil 57. The junction of the relay coils 56 and 57 is connected to the slider 69 of the control potentiometer and the slider 44 of the balancing potentiometer. By reason of these wiring connections it is seen that the control potentiometer, the balancing potentiometer and the relay coils are connected in parallel.

Assume the parts in the position shown in the drawings and particularly with the pivot pin 42 in the right hand end of the slot 41 of the lever 40. With the pivot pin in this position the distance between the pivot pin 42 and the operating pin 39 is equal to the distance between the pivot pin 42 and the resistance element 45. Therefore the lever arms are equal and for a given movement of the operating pin 39, the slider 44 is moved in equal amount. Assume now that the space temperature decreases, the slider 69 thereupon moves toward the right to partially short circuit the relay coil 57 to decrease the energization thereof and increase the energization of the relay coil 56. The switch arm 59 thereupon moves into engagement with the contact 60 to complete a circuit from the line wire 65 through wire 74, switch arm 59, contact 60, wire 75, contacts 53 and 52, wire 76, field winding 23 and wire 77 back to the other line wire 66. This causes energization of the field winding 23 to move the valve 10 toward an open position to increase the supply of heat to the space. Movement of the valve 10 towards an open position causes downward movement of the slider 44 of the balancing potentiometer. This downward movement of the slider 44 partially short circuits the relay coil 56 to decrease the energization thereof and increase the energization of the relay coil 57. When the slider 44 has moved downwardly sufficiently far to rebalance the energization of the relay coils 56 and 57, the switch arm 59 moves out of engagement with the contact 60 to break the circuit through the field winding 23. In this manner the valve 10 is positioned toward an open position in direct accordance with the amount of decrease in space temperature.

Upon an increase in space temperature the slider 69 of the control potentiometer moves to the left to decrease the energization of the relay coil 56 and increase the energization of the relay coil 57. As a result the switch arm 59 moves into engagement with the contact 61 to complete a circuit from the line wire 65 through wire 74, switch arm 59, contact 61, wire 78, contacts 51 and 50, wire 79, field winding 24 and wire 77 back to the other line wire 66. Completion of this circuit energizes the field winding 24 to move the valve 10 towards a closed position. Operation of the motor 11 to move the valve 10 towards a closed position causes upward movement of the slider 44 of the balancing potentiometer. This upward movement of the slider 44 decreases the energization of the relay coil 57 and increases the energization of the relay coil 56. When the slider 44 has moved upwardly sufficiently far to rebalance the energization of the relay coils 56 and 57 the switch arm 59 is moved out of engagement with the contact 61 to break the circuit through the field winding 24. In this manner the valve 10 is positioned toward a closed position in direct accordance with the amount of increase in space temperature.

From the above it is seen that the motor 11 and the valve 10 are positioned in direct accordance with the position of the slider 69 of the control potentiometer and with the fulcrum 42 of the lever 40. In the position shown in Figure 1, the valve 10 will be completely open when the slider 69 is in the extreme right hand position and will be completely closed when the slider 69 is in the extreme left hand position. Likewise when the slider 69 is in a mid position the valve 10 will also be in a mid position. In other words, the movement of the slider 69 through a given range of movement causes movement of the motor 11 and valve 10 through a given range of movement.

Oftentimes it is desirable to decrease the range of movement of the motor and valve with respect to the complete range of movement of the slider 69 of the control potentiometer. In other words it is often desirable to have the motor and valve move only partially when the slider 69 is operated through its complete range of movement.

Further it is desirable to shift bodily the range of movement of the motor and valve with respect to the position of the slider of the control potentiometer. These adjustments of the range of movement of the motor and valve may be accomplished by shifting the pivot pin 42 forming the fulcrum for the lever 40.

In carrying out this arrangement a bracket 85 is utilized, this bracket being secured by suitable means such as screw 86 to a support 87. An eccentrically headed screw 88 operating in a slot 89 may be utilized for accurately aligning the bracket 85. Several such securing and adjusting means are used, but only one is shown. The bracket 85 is provided with an aperture 90, one end of the aperture having a circular contour 91 of one radius and the other end of the aperture having a circular contour 103 of another radius. The circular contours are concentric with each other. Located in the aperture 90 is a member 92 having circular end 93 in slideable contact with the circular contour 103 and having circularly arranged abutments 94 and 95 in sliding relation to the circular contour 91. By reason of this construction the member 92 is rotatably mounted in the aperture 90 of the bracket 85, the center of rotation being concentric with the centers of the contours 91 and 103. Lugs 96, 97 and 98 maintain the member 92 within the aperture 90 of the bracket 85. The member 92 is provided with an arm 99 having a slot 100. A screw 101 extends through the slot 100 and is utilized for the purpose of clamping the member 92 in any of its rotatable positions. The arm 99 is provided with pointer 102 which registers with suitable indicia on the bracket 85 for indicating the angular position of the member 92.

The member 92 is provided with a longitudinal slot 105 and the pin 42 which forms the fulcrum for the lever 40 is carried by a block 106 which is slideably mounted in the slot 105. The block 106 may be adjustably positioned along the slot 105 and may be clamped in any of these adjusted positions in any suitable manner. The block 106 is provided with a pointer 107 which is adapted to register with suitable indicia located on the member 92. Movement of the block 106 longitudinally in the slot 105 causes longitudinal movement of the pivot pin 42 in the slot 41 of the lever 40 and by this arrangement the leverage of the lever 40 is adjusted. Rotation of the member 92 causes upward or downward movement of the pivot pin 42 and therefore causes upward or downward adjustment of the fulcrum of the lever 40. In this manner a two-way adjustment of the fulcrum for the lever 40 is provided, the longitudinal adjustment controlling the range of movement and the vertical adjustment controlling the position of the range of movement.

For purposes of illustration it is assumed that the motor 11 and the valve 10 are so arranged that 180° rotation of the motor 11 is required to move the valve from one extreme position to the other. Also complete movement of the slider 44 of the balancing potentiometer from one extreme position to the other is required to rebalance the relay when the slider 69 of the control potentiometer is moved from one extreme position to the other. With the parts shown in Figure 1 the slider 69 of the control potentiometer, the slider 44 of the balancing potentiometer and the valve 10 are all in a mid position and also the motor 11 is in a mid position. The fulcrum 42 of the lever 40 is located at the right end of the slot 41 of the lever 40 and in line with the 180° designation on the member 92. As a result the leverage of the lever 40 is one. The slot 105 of the member 92 is horizontally arranged and the pointer 102 is in alignment with the designation A carried by the bracket 85. The pin 39 which operates the lever 40 is positioned in direct accordance with the position of the motor 11 and the valve 10. Therefore when the motor 11 is moved from one extreme position to the other, the pin 39 is moved through a given distance.

Figure 2:
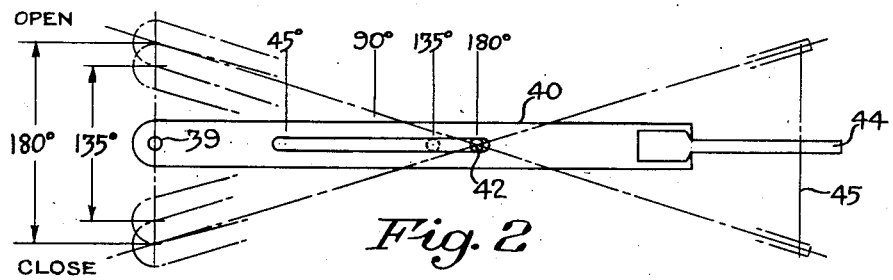

Figure 2 illustrates the position of the lever 40 when the parts are in the position shown in Figure 1. The travel of the pin 39 at the left of Figure 2 is designated in degrees of motor rotation and the right hand portion of Figure 2 shows the movement of the slider 44 of the balancing potentiometer. Assume now that the slider 69 of the control potentiometer is moved to the extreme right hand position, the motor 11 will thereupon be operated to move the slider 44 of the balancing potentiometer downwardly until it reaches its extreme lower position to rebalance the relay 12. The motor and the valve is thereupon moved to one extreme position which in this instance is the open position. When the slider 69 of the control potentiometer is moved to the extreme left hand position the motor 11 is operated in the opposite direction to move the slider 44 of the balancing potentiometer upwardly and the motor will continue to operate until such time as the slider 44 reaches its upper extreme position to rebalance the relay 12. With the fulcrum 42 in the 180° position, 180° rotation of the motor is required to move the slider of the balancing potentiometer completely across its resistance element. Therefore the motor 11 is moved through its complete range of movement when the fulcrum 42 is positioned in the 180° position upon movement of the slider 69 of the control potentiometer through its complete range of movement.

If now the fulcrum 42 be adjusted horizontally in the slot 105 of the member 92 to the 135° position it is seen that the distance between the operating pin 39 and the fulcrum 42 is decreased and the distance between the fulcrum 42 and the resistance element 45 is increased. Therefore the motor does not have to travel through its complete range of movement to move the slider 44 completely across the resistance element 45. When the fulcrum 42 is moved to the 135° position, as shown in dotted lines in Figure 2, the motor only travels through 135° when the slider 69 of the control potentiometer is moved through its complete range of movement.

Figure 3:
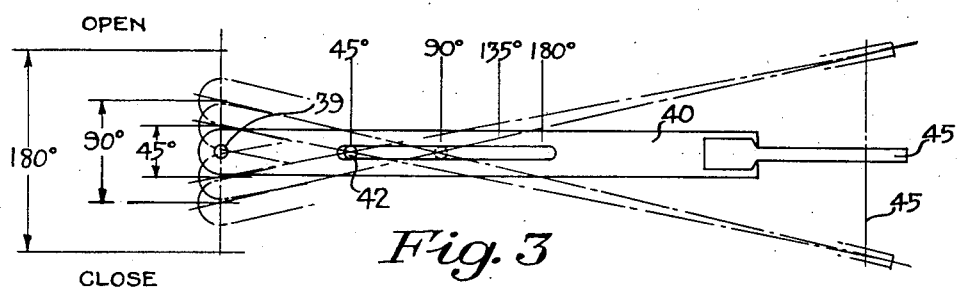

If the fulcrum 42 is moved to the 90° position, as shown in dotted lines in Figure 3, the motor 11 only operates through 90° of its travel when the slider 69 of the control potentiometer is moved through its complete range of movement. Similarly if the fulcrum 42 is moved to the 45° position the motor only travels through 45° of rotation upon movement of the slider 69 of the control potentiometer through its complete range of movement.

From the above it is seen that when the member 92 is horizontally arranged so that the pointer 102 coincides with the designation A, horizontal adjustment of the fulcrum 42 from the right to the left decreases the range of movement of the motor with respect to the range of movement of the control potentiometer. In this connection it is pointed out that the mid point of the range of movement of the motor 11 is maintained constant regardless of the adjustment. In other words when the slider 69 of the control potentiometer is in a mid position the motor 11 is likewise in a mid position. Stated in still another way, the range of movement of the motor is decreased equally at both ends of the range.

Figure 4:
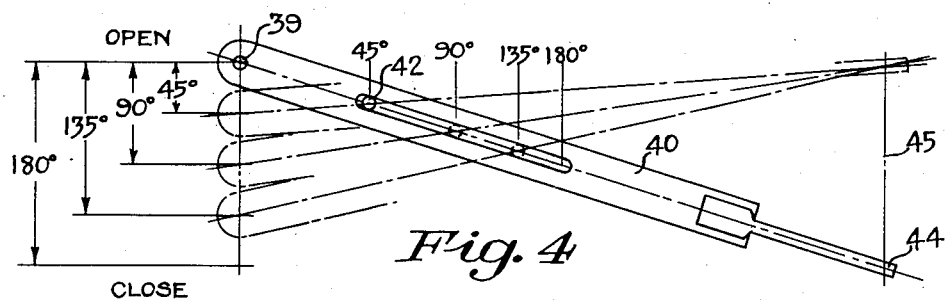

By rotating the member 92 so that the pointer 102 aligns with the designation B the end point of the range of movement of the motor is maintained constant and such operation is shown in Figure 4. With the fulcrum 42 in the 45° position, the motor will operate through 45° of rotation from one extreme position. If the fulcrum 42 is moved to the 90° position the motor operates through 90° from one extreme position and similarly when the fulcrum 42 is positioned in the 135° and 180° positions the motor operates through 135° and 180° from one extreme position. It follows then that with the pointer 102 coinciding with the designation B adjustment of the fulcrum 42 along the slot 105 of the member 92 varies the range of movement of the motor but one end of the range of movement is maintained substantially constant while the other end is adjusted. As shown in Figure 4 the various adjustments will move the valve a varying amount from the wide open position toward a closed position depending upon the adjustment.

Figure 5:
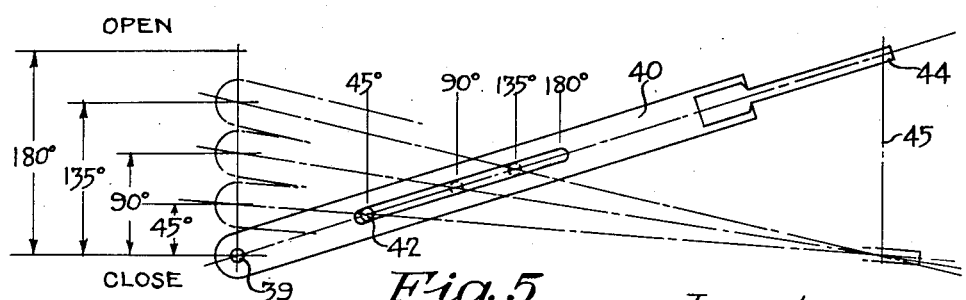

Figure 5 illustrates the mode of operation when the member 92 is rotated so that the pointer 102 aligns with the designation C. The mode of operation of Figure 5 is the same as that of Figure 4 except that the other end of the range is maintained constant. In other words with the adjustment utilized in Figure 5, the valve is moved a varying amount from the closed position toward the open position depending upon the adjustment.

By reason of the above construction there is provided a follow-up control system wherein the range of movement of the operating means may be varied with respect to the range of movement of the control means, wherein the mid point of the range of movement of the operating means may be maintained constant with the ends of the range of movement being equally adjusted, wherein one end of the range of movement may be maintained constant while only the other end of the range of movement is varied and wherein the other end of the range of movement may be maintained constant and the remaining end varied. It follows also that any intermediate point of the range of movement of the operating means may be maintained constant while the range of movement is varied. Such an adjusting mechanism provides a simple means for obtaining an extremely flexible control which adapts the follow-up control system for many uses.

Although the control system has been described in connection with a heating system it will be apparent that its use is not so limited since the control system may be utilized for controlling any condition.

This invention also contemplates the use of an indicator for indicating motor or valve positions. In carrying out this feature a slider 111 is secured by an insulating pad 110 to the depending lug 33 of the pivoted lever 32. The slider 111 is adapted to slide across a resistance element 112 suitably secured to a stationary bracket 113. The slider 111 is positioned in direct accordance with the position of the motor 11 and the valve 10. The slider 111 and the resistance element 112 form a control potentiometer for an indicator generally designated at 114.

The indicator 114 may comprise coils 115 and 116 for influencing an armature 117 which in turn operates a pointer 118 with respect to suitable indicia. The adjacent ends of the coils 115 and 116 are connected together and the outer ends are connected across a secondary 123 of a stepdown transformer 119 having a primary 120 which in turn is connected across line wires 121 and 122. The left end of the coil 115 is connected through a protective resistance 125 to the lower end of resistance element 112 while the right end of the coil 116 is connected through a protective resistance 124 to the upper end of the resistance element 112. The junction of the coils 115 and 116 is connected to the slider 111. By reason of these connections it is seen that the potentiometer and the series connected coils are connected in parallel with respect to each other and across a source of power.

With the parts in the position shown in Figure 1 the slider 111 is in a mid position and by reason of the parallel relationship pointed out above the coils 115 and 116 are equally energized and therefore the pointer 118 is in a mid position. As the valve 10 is moved toward an open position the slider 111 is moved upwardly to decrease the energization of the coil 116 and increase the energization of the coil 115 to move the pointer 118 toward the left or open position. In a like manner closing movement of the valve 10 causes downward movement of the slider 111 to decrease the energization of the coil 115 and increase the energization of the coil 116 whereupon the pointer 118 is moved toward the right or the closed position. The pointer 118 is moved in direct accordance with the movement of the slider 111 and therefore the pointer 118 directly indicates the position of the motor 11 and the valve 10. The indicator shown in the drawings is for purposes of illustration only and other types may be utilized in place thereof.

Although for purposes of illustration I have shown one form of my invention, other forms thereof may become apparent to those skilled in the art upon reference to this specification and therefore this invention is to be limited only by the scope of the appended claims and prior art.

I claim as my invention:

1. In a control system, the combination of a control means movable through a given range of movement, motor means for performing a function, follow-up means operated by the motor means, means controlled by the control means and the follow-up means for controlling the operation of the motor means to position the motor means in accordance with the position of the control means whereby the motor means is moved through a given range of movement upon movement of the control means through a given range, and means for mechanically adjusting the follow-up means to increase or decrease the range of movement of the motor means with respect to the range of movement of the control means and for maintaining any desired point of the range of movement of the motor means substantially constant.

2. In a control system, the combination of a control resistance means adjustable through a given range of adjustment, electric motor means for performing a function, balancing resistance means adjusted by the motor means, relay means controlled conjointly by the control resistance means and the balancing resistance means for controlling the operation of the electric motor means to position the motor means in accordance with the adjustment of the control resistance means whereby the motor means is moved through a given range of movement upon adjustment of the control resistance means through a given range, and means for mechanically adjusting the balancing resistance means to increase or decrease the range of movement of the motor means with respect to the range of adjustment of the control resistance means.

3. In a control system, the combination of a control resistance means adjustable through a given range of adjustment, electric motor means for performing a function, balancing resistance means adjusted by the motor means, relay means controlled conjointly by the control resistance means and the balancing resistance means for controlling the operation of the electric motor means to position the motor means in accordance with the adjustment of the control resistance means whereby the motor means is moved through a given range of movement upon adjustment of the control resistance means through a given range, and means for adjusting the balancing resistance means to increase or decrease the range of movement of the motor means and to shift the range of movement of the motor means with respect to the range of adjustment of the control resistance means.

4. In a control system, the combination of a control means movable through a given range of movement, motor means for performing a function, follow-up means operated by the motor means, means controlled by the control means and the follow-up means for controlling the operation of the motor means to position the motor means in accordance with the position of the control means whereby the motor means is moved through a given range of movement upon movement of the control means through a given range, and a single adjustable means for adjusting the extent of the range of movement of the motor means with respect to the range of movement of the control means without varying the end position of the range of movement of the motor means.

5. In a control system, the combination of a control means movable through a given range of movement, motor means for performing a function, follow-up means operated by the motor means, means controlled by the control means and the follow-up means for controlling the operation of the motor means to position the motor means in accordance with the position of the control means whereby the motor means is moved through a given range of movement upon movement of the control means through a given range, and a single adjustable means for mechanically adjusting the follow-up means to vary the extent of the range of movement of the motor means with respect to the range of movement of the control means without varying the end position of the range of movement of the motor means.

6. In a control system, the combination of a control resistance means adjustable through a given range of adjustment, electric motor means for performing a function, balancing resistance means adjusted by the motor means, relay means controlled conjointly by the control resistance means and the balancing resistance means for controlling the operation of the electric motor means to position the motor means in accordance with the adjustment of the control resistance means whereby the motor means is moved through a given range of movement upon adjustment of the control resistance means through a given range, and means for adjusting the balancing resistance means to vary the extent of the range of movement of the motor means with respect to the range of adjustment of the control resistance means without varying the end position of the range of movement of the motor means.

7. In a control system, the combination of a control means movable through a given range of movement, motor means for performing a function, follow-up means operated by the motor means, means controlled by the control means and the follow-up means for controlling the operation of the motor means to position the motor means in accordance with the position of the control means whereby the motor means is moved through a given range of movement upon movement of the control means through a given range, limiting means for terminating the movement of the motor at the end of the range of movement of the follow-up means, and a single adjusting means for adjusting simultaneously the follow-up means and the limiting means to vary the range of movement of the motor means with respect to the range of movement of the control means without affecting the relation between the follow-up means and the limiting means.

8. In a control system, the combination of a control means movable through a given range of movement, motor means for performing a function, follow-up means operated by the motor means, means controlled by the control means and the follow-up means for controlling the operation of the motor means to position the motor means in accordance with the position of the control means whereby the motor means is moved through a given range of movement upon movement of the control means through a given range, limiting means for terminating the movement of the motor at the end of the range of movement of the follow-up means, and a single adjusting means for adjusting simultaneously the follow-up means and the limiting means to vary the extent of the range of movement of the motor means with respect to the range of movement of the control means without affecting the relation between the follow-up means and the limiting means.

9. In a control system, motor means, a control means therefor movable through a given range of movement, follow-up means movable by the motor and adapted to terminate the movement of the motor at a position corresponding to the position of the control means, limiting means for terminating the movement of the motor independently of the control means at the end of the range of movement of the follow-up means, means including a pivoted lever for operatively connecting the motor with both the follow-up and limiting means, and means for adjustably positioning the pivot of the pivoted lever for altering the operation of the follow-up means and the limiting means by the motor means whereby the range of movement of the motor relative to the range of movement of the control means is altered.

GEORGE D. BOWER.